United States Patent
Weinstein et al.

(10) Patent No.: US 7,101,123 B1
(45) Date of Patent: Sep. 5, 2006

(54) FIXTURE FOR DRILLING POCKET HOLES IN WORKPIECES OF DIFFERENT THICKNESSES

(75) Inventors: Burton Weinstein, New York, NY (US); Richard H. Deaton, New York, NY (US)

(73) Assignee: Simp'l Products, Inc., Mount Vernon, NY (US)

( * ) Notice: Subject to any disclaimer, the term of this patent is extended or adjusted under 35 U.S.C. 154(b) by 213 days.

(21) Appl. No.: 10/920,083

(22) Filed: Aug. 17, 2004

(51) Int. Cl.
*B23B 47/28* (2006.01)

(52) U.S. Cl. ................................ 408/103; 409/115 R

(58) Field of Classification Search ................. 408/97, 408/103, 115 R, 241 B
See application file for complete search history.

(56) References Cited

U.S. PATENT DOCUMENTS

| | | | | |
|---|---|---|---|---|
| 1,919,900 A | * | 7/1933 | Moller | 408/95 |
| 3,338,277 A | * | 8/1967 | Tornoe et al. | 144/27 |
| 3,635,571 A | * | 1/1972 | Roberts et al. | 408/97 |
| 4,955,766 A | * | 9/1990 | Sommerfeld | 408/87 |
| 5,076,742 A | * | 12/1991 | Lee et al. | 408/112 |
| 5,573,352 A | * | 11/1996 | Matadobra | 409/132 |
| 5,676,500 A | * | 10/1997 | Sommerfeld | 408/103 |
| 6,254,320 B1 | * | 7/2001 | Weinstein et al. | 408/103 |
| 6,481,937 B1 | * | 11/2002 | Sommerfeld et al. | 408/115 R |
| 7,001,118 B1 | * | 2/2006 | Weinstein et al. | 408/103 |
| 2005/0089381 A1 | * | 4/2005 | Liu et al. | 408/115 R |

* cited by examiner

Primary Examiner—Daniel W. Howell
(74) Attorney, Agent, or Firm—Gordon D. Coplein

(57) ABSTRACT

A fixture for drilling pocket holes in workpieces of different thicknesses is formed of a U-shaped member having parallel guide and clamp legs and joined by a transverse base leg. One or more guide channels are formed in the guide leg at an angle to the guide leg that has an external entrance for a drill bit and an exit on the guide leg interior opposite a first surface of the workpiece in which a hole is to be drilled. There is a floor on which a second surface, the narrow edge, of the workpiece that is transverse to the workpiece first surface is to rest that is vertically adjustable relative to the guide channel exit, and an adjustable screw clamp threaded in the clamp leg to engage a third surface of the workpiece opposite the workpiece first surface to hold the workpiece first surface against the interior surface of said guide leg during the time a drill bit is advanced in the guide channel to the workpiece first surface.

11 Claims, 3 Drawing Sheets

FIXTURE FOR DRILLING POCKET HOLES IN WORKPIECES OF DIFFERENT THICKNESSES

FIELD OF THE INVENTION

The invention relates to a fixture for drilling pocket holes in a workpiece.

BACKGROUND OF THE INVENTION

The use of fixtures for location and guidance of a drill bit to drill holes in a workpiece, such as a piece of wood, for pocket joints is well known. A pocket hole is one that is made at an angle in a piece of wood and a wood screw is inserted into the hole to join the workpiece to another wood piece. The screw is recessed in the pocket hole and is not exposed.

U.S. Pat. No. 6,254,320, which owned by the assignee of the subject application and the disclosure of which is incorporated herein by reference, discloses an improved and relatively simple fixture for making pocket holes in a workpiece. In accordance with the invention of that patent, the fixture is a U-shaped extrusion one leg of which is a guide leg against whose interior the surface of the workpiece in which a pocket hole to be drilled rests. The guide leg has angled channels to accept and guide a drill bit. The fixture leg opposite to the guide leg has a threaded hole through which passes a screw clamp and a base leg connects the guide and clamp legs to complete the U.

In the use of the fixture of the patent, the narrow edge of the workpiece rests on the interior of the base leg and the face surface in which the pocket hole is to be drilled is clamped against the interior surface of the guide leg by adjusting the threaded clamp to engage the opposite workpiece face. The distance between the base leg interior and drill bit guide channel exit sets the point on the workpiece at which the pocket hole is drilled. The clamp holds the workpiece securely against the guide leg while the drill bit is advanced through the angled guide channel to make an angled pocket hole in the workpiece.

The fixture of the patent is simple in construction and efficient in operation permitting precise drilling of a pocket hole in a workpiece. However, it has a limitation in that its use is substantially limited to a workpiece of one thickness which is basically determined by the distance between the exit of the guide channel for the drill bit and the upper surface of the base leg on which the workpiece narrow edge rests. Accordingly, it would be advantageous to be able to increase the functionality of a fixture of this type to be able to drill pocket holes in workpieces of different thicknesses.

BRIEF DESCRIPTION OF THE INVENTION

In accordance with the invention, an improved and more versatile fixture of the type of the aforesaid patent for drilling pocket holes is provided that can accommodate workpieces of different thickness. This is accomplished by providing the fixture with the ability to vary the distance between the drill bit guide channel exit and the surface, or floor, on which the workpiece narrow edge rests. In one embodiment of the invention, a shelf is provided that is held between opposing slots in the guide leg and clamp leg and the workpiece edge rests on the shelf. There are a number of set of these slots spaced vertically apart. The shelf is vertically adjustably positioned relative to the drill bit guide channel exit by selecting the set of slots in which it is placed. Each of the shelf vertical positions sets a different distance of the face of the workpiece in which the pocket hole is to be drilled relative to the drill bit guide channel exit. This permits workpieces of different thicknesses to be accommodated for drilling of the pocket hole.

In another embodiment of the invention, a shelf on which the workpiece edge rests is provided that is mounted to the guide leg by an adjustable screw. The vertical height of the shelf relative to the drill bit guide channel exit and the fixture base is set by the screw. This sets the proper height for different thicknesses of workpieces that can be clamped against the guide leg for drilling of the pocket hole in the correct place on the workpiece. In both embodiments, the shelf can be removed and the workpiece narrow edge placed directly on the base.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
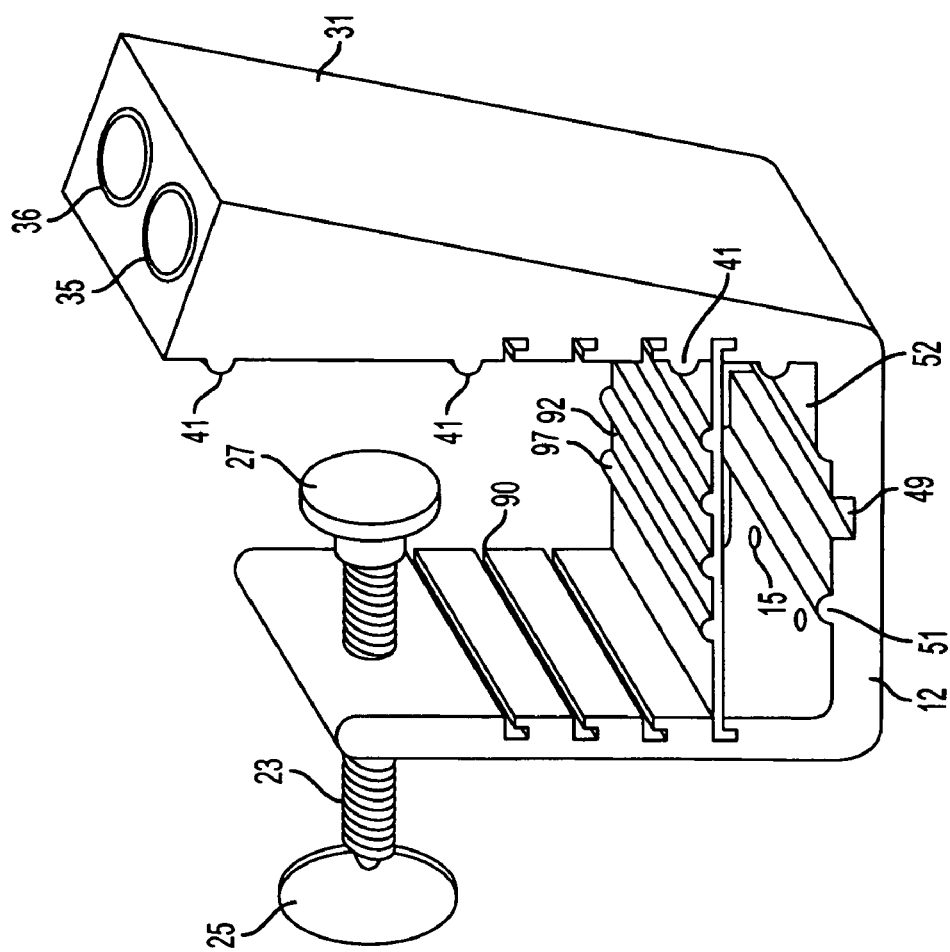
FIG. 1 is an elevational view in cross-section of one embodiment of the invention.
Figure 2:
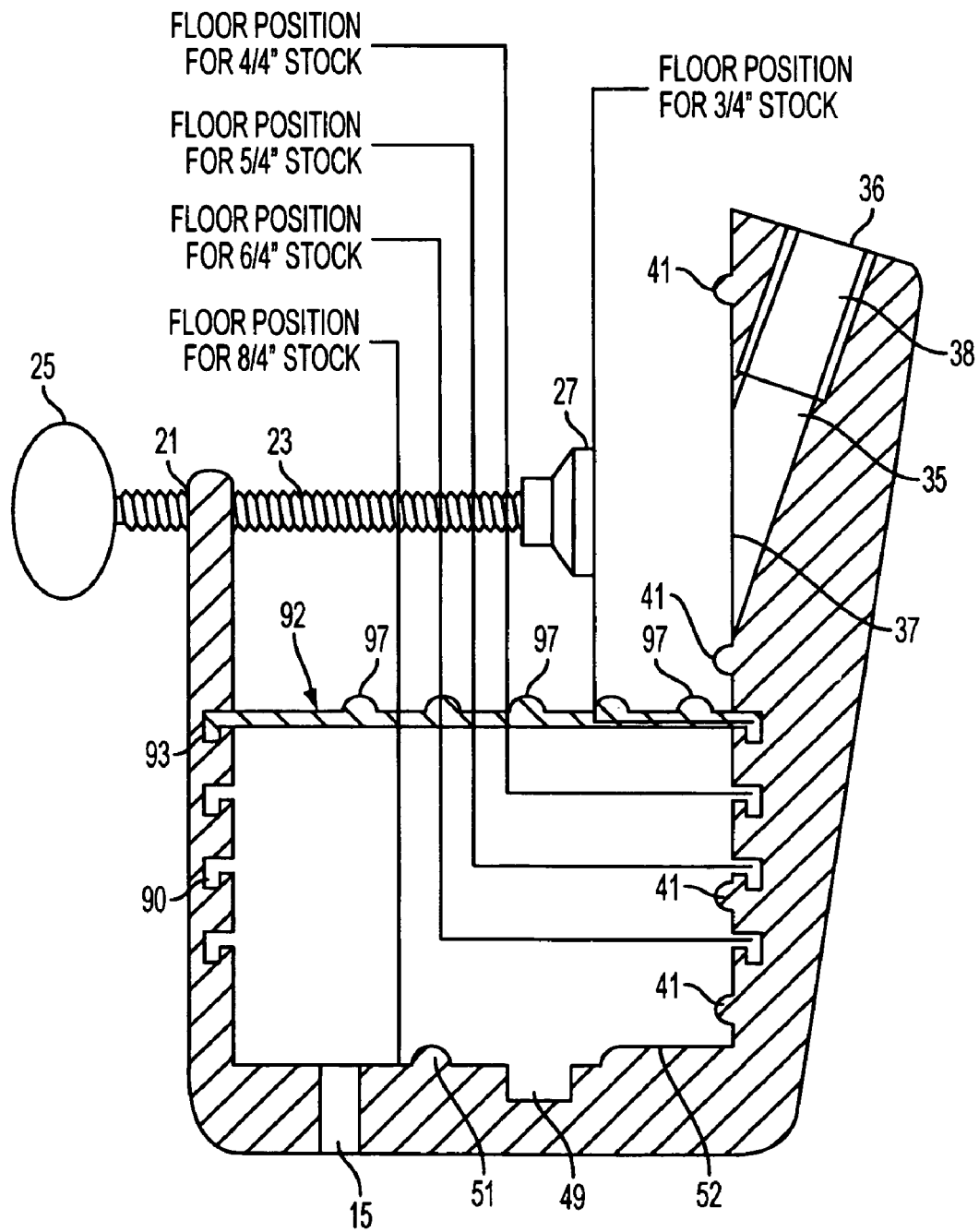
FIG. 2 is a front perspective view of the fixture of FIG. 1.

Referring to FIGS. 1 and 2, the fixture 10 is generally U-shaped and can be made of any suitable construction, such as an aluminum extrusion or casting. Any suitable material can be used. The fixture has a base leg 12 which connects two legs 14 and 16, hereafter referred to as the clamp leg and the guide leg. The outer surface of the base leg 12 has flat portions to permit the fixture to rest on a flat surface S. Several holes 15 preferably are formed in a base leg channel 48 to permit passage of screws (not shown) to secure the fixture to the surface S. This is not essential.

The clamp leg 14 is transverse to the base leg 12 and has a threaded hole 21 to accept a threaded thumb screw clamp 23 having a thumb engaging piece 25 exterior to the fixture and a workpiece engaging cap 27 interior of the fixture. The position of cap 27 relative to the opposing fixture guide leg 16 is controlled by turning the screw. While the cap 27 is shown as having a circular outer face of only somewhat greater diameter than the screw, it can be enlarged to provide a larger surface for engaging the workpiece W.

The inner face of the guide leg 16 is transverse to the inner face of the base leg 12. The guide leg has an upper part 31 that flares outwardly at the angle that the pocket hole is to be drilled. As seen, guide leg 16 tapers from a thick upper part to the thinner bottom part which joins to the base leg 12. The outer surface of the guide leg 16, as well as that of the base and clamp legs 12 and 14, are shown with spaced depressed sections, such as 13 on the base leg 12, across the width of each leg. These are primarily for decorative and fixture manufacturing purposes.

As seen in FIG. 1, a pair of spaced angled guide channels 35 are formed in the thick upper part 31 of guide leg 16. The number of guide channels 35 and the spacing between the channels can be selected as desired and there can be only a single channel. The interior of one of the channels 35 is described referring to FIG. 2 and the description of the other channel would be the same. The channel has an entrance 36 at the guide leg 16 top end and an exit 37 on the interior of the guide leg for a drill bit (not shown) which is rotated by a drill (also not shown). A bushing 38 of a hardened metal preferably is located in the channel 35 to set the size of the drill bit to be accepted and to withstand wear caused by the rotating drill bit. The angle of each channel 35 in guide leg 16 upper part 31 is the angle to be made for the pocket hole in the workpiece. The exit 37 of channel 35 on the interior of the guide leg is of generally elliptical shape since the channel 35 is at an angle to the guide leg.

A number of ribs 41 preferably are formed vertically spaced apart on the interior of the intermediate part of vertical guide leg 16 to engage a first surface of the workpiece surface in which the pocket hole is to be drilled. The interior ribs 41 are shown extending horizontally of the leg 16 if considered to be vertical. That is, the ribs 41 are transverse to the length of leg 16. The outer surface of the ribs 41 all are in the same plane to define positioning points in the same plane against which a first surface of a workpiece W in which the pocket hole is to be drilled is to rest, as shown in FIG. 1. This plane is transverse to a plane of the inner face of the base leg 12. The exit 37 of the guide channel 35 is in the space between two of the ribs 41. If desired, the ribs 41 can extend in the same direction as the leg 16, i.e. be vertical. Here also the guide channel exit 37 would be between the ribs. The space between the guide leg interior wall and the extreme outer points of ribs 41 provide an exit for wood chips from the drill. The ribs 41 are not absolutely necessary and the workpiece first surface can be placed flush against the interior of guide leg 16.

The base leg 12 interior has a recess 49 located at a point where the drill bit would exit from a workpiece whose narrow edge rests on the interior of the base 12. That is, the recess 49 has an approximate center at an extension of a line passing through the center of the guide channel 35. The recess 49 can be located between a rib 51 and a part 52 of the base that extend across the base leg width as shown in FIG. 1. The top surfaces of the rib 51 and base part 52 define the plane of one floor on which the second, narrow edge, surface of the workpiece rests.

As is seen in FIGS. 1 and 2, there are a series of sets of slots 90 vertically spaced on the interior walls of the clamp and guide legs 14 and 16 into which the ends of a shelf 92 can be slid so that the shelf will be firmly held. As shown in FIG. 2, each shelf has a turned down lip 93 on its edge. The slots 90 are formed to accommodate these lips. The lips 93 provide greater stability for the shelf and prevent the guide and clamp legs from spreading apart as the pocket hole is being drilled. However, the lips are not totally essential. The shelf 92 also has a plurality of raised ribs 97 spaced apart and illustratively shown extending in the direction of the slots 90 although they could be transverse to the slots. The extreme outer points of the ribs 97 are all in the same plane which is parallel to the plane of the interior of base leg 12. When inserted in any set of opposing slots 90, the ribs 97 of shelf 92 form a floor for the workpiece narrow edge, or second, surface to rest. The floor defined by the shelf 92 and its ribs 97 will be parallel to the interior of the base leg 12 and its rib 51 and base part 52 and transverse to the interior of guide leg 16 and its ribs 41.

The vertical spacing of the slot sets 90 corresponds to different thicknesses of the workpieces in which the pocket holes are to be drilled. For example, as illustratively shown in FIG. 2, there can be four sets of slots 90 starting from the bottom up on legs 14 and 16 to accommodate workpieces of nominal ⅝", ⅝", ⅖", and ¾" thickness. In a preferred embodiment of the fixture, a workpiece of ¾" thickness can be accommodated with the shelf 92 removed and the workpiece edge resting directly on the ribs 51 on the inner surface of the base leg 12. There can be as many of the slot sets 90 spaced as desired to accommodate a different thicknesses so long as the structural integrity of the walls 14 and 16 is not comprised. While slots 90 are shown to hold the shelf 92, the opposite arrangement of ridges or ledges can be used in place of the slots.

In use of the fixture of FIGS. 1–2, the shelf 92 is inserted into one of the slot sets 90, depending upon the thickness of the workpiece in which the pocket hole is to be drilled. The workpiece narrow edge is placed on the shelf ribs 97, or on the base leg 12 if the shelf 92 is not used, and the clamp 25 is adjusted to hold the workpiece first surface against the guide wall 16 as the pocket hole is being drilled. The raised ribs 97 on the shelf prevent the end of the drill from hitting the shelf 92 as it exits the workpiece narrow edge to avoid damage to the drill bit.

Figure 3A:
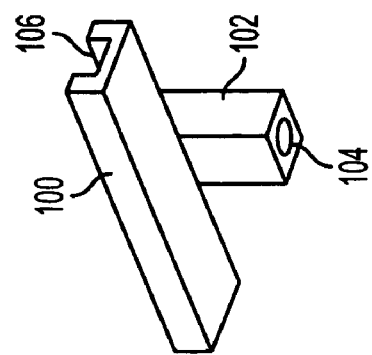
FIG. 3A is a perspective view of the shelf of the fixture of FIG. 3.
Figure 3:
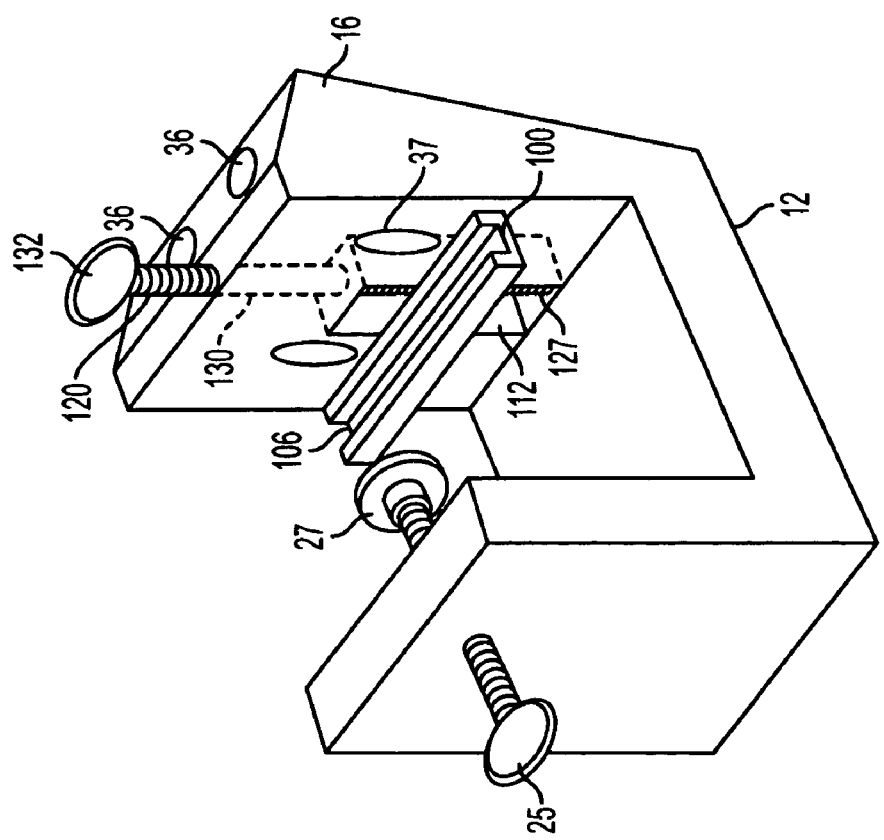
FIG. 3 is a side perspective view of another embodiment of the fixture of the invention.

FIGS. 3 and 3A show a further embodiment of the invention in which the same elements are given the same reference numbers. Here, there is a shelf 100 having a neck 102 with a threaded hole 104. The shelf 100 is to serve as the floor for the narrow edge of the workpiece. The shelf neck 102 fits slidably in a cavity 112 cut vertically in the guide leg 16. A vertical hole 120 is made in the guide leg 16 from the top of the guide leg to the top of cavity 112. A screw 130 passes from the top of the guide leg 12, into the cavity 112, is threaded in the hole 104 of shelf neck 102, and has its bottom end rotatable in a hole 127 at the bottom of cavity 112 or on the floor of the cavity. There is a thumbscrew 132 at the upper end of the screw 130. Rotating the thumbscrew 132 rotates screw 130 which in turn raises or lowers shelf 100 depending upon the direction of screw 130 rotation. This sets the vertical position of the shelf 100 relative to the exits 37 of the drill bit guide channels 35. An elongated slot or groove 106 is made in the shelf 100 across its width and in line with each of the exits 37 of the guide channels.

In the operation of this embodiment, the workpiece narrow edge is set on the shelf 100 and the adjustment screw 130 rotated by the thumb piece 132 to set the vertical height of shelf 100. This positions the shelf 100 relative to the drill bit guide channel exits 37. The shelf 100 vertical height is adjusted depending upon the thickness of the workpiece in which the pocket holes are to be drilled as explained with respect to FIGS. 1 and 2. As contrasted to the embodiment of FIGS. 1–2, This embodiment provides a continuous range of adjustment and height selection. The clamp leg thumbscrew 25 is rotated to engage the workpiece to hold its first surface in which the hole is to be drilled against the inner face if the guide leg 16 as the pocket holes are drilled. If the drill bit passes through the narrow edge of the workpiece on the shelf 100, it enters the slot 106 so that it will not be damaged.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A fixture for drilling pocket holes in a workpiece, said fixture comprising:

a U-shaped unitary one piece member having a base leg, a guide leg and a clamp leg with said base leg being transverse and joined to said guide leg and said clamp leg, a first surface of the workpiece in which a hole is to be drilled to engage an interior surface of said guide leg;

a guide channel formed in said guide leg at an angle to said guide leg and having an entrance for a drill bit on an exterior surface of said guide leg and an exit on said guide leg interior surface which opposes the workpiece first surface;

a shelf on which a second surface of the workpieces that is transverse to the workpiece first surface is to rest, said shelf having a neck;

a vertical cavity in said guide leg in which said shelf neck can slide;

an adjustment screw in a hole in said guide leg and threaded to said shelf to adjust the vertical spacing of said shelf relative to said guide channel exit as said adjustment screw is rotated, said shelf being transverse to both said guide and clamp legs and being vertically adjustable relative to the interior of said base leg; and an adjustable screw clamp threaded in said clamp leg and movable by rotation of said screw to engage a third surface of the workpiece that is opposite the workpiece first surface to hold the workpiece first surface against the interior surface of said guide leg during the time a drill bit is advanced in said guide channel to the workpiece first surface.

2. A fixture for drilling pocket holes in a workpiece, said fixture comprising:

a U-shaped unitary one piece member having a base leg, a guide leg and a clamp leg with said base leg being transverse and joined to said guide leg and said clamp leg, a first surface of the workpiece in which a hole is to be drilled to engage an interior surface of said guide leg;

a guide channel formed in said guide leg at an angle to said guide leg and having an entrance for a drill bit on an exterior surface of said guide leg and an exit on said guide leg interior surface which opposes the workpiece first surface;

a shelf on which a second surface on the workpiece that is transverse to the workpiece first surface is to rest;

a plurality of vertically spaced sets of structure on the opposing walls of said guide and clamp legs to hold said shelf at a selected vertical position relative to said guide channel exit and spaced from and parallel to the interior of said base leg, said shelf when engaging a set of said structures being transverse to both said guide and clamp legs and being vertically adjustable relative to the interior of said base leg; and an adjustable screw clamp threaded in said clamp leg and movable by rotation of said screw to engage a third surface of the workpiece that is opposite the workpiece first surface to hold the workpiece first surface against the interior surface of said guide leg during the time a drill bit is advanced in said guide channel to the workpiece first surface.

3. A fixture as claimed in claim 2 wherein said structure sets comprise a plurality of slots in said guide and clamp legs.

4. A fixture as claimed in claim 3 wherein said shelf has a turned down lip on each edge and each said slot is shaped to accept a said lip.

5. A fixture as claimed in claim 2 further comprising a plurality of raised ribs on said shelf on which the workpiece second surface rests to provide spaces into which the end of a drill bit can exit as the pocket hole is drilled in the workpiece.

6. A fixture as claimed in claim 3 further comprising raised ribs on the upper surface of said shelf on which the workpiece second surface rests forming spaces between the workpiece second surface and the top surface of said shelf into which the end of a drill bit can exit as the pocket hole is drilled in the workpiece.

7. A fixture as claimed in claim 2 further comprising a pair of through holes in said base leg for screws to pass to fasten said fixture to a surface.

8. A fixture as claimed in claim 1 further comprising a slot in said shelf into which the end of a drill bit can exit as the pocket hole is drilled in the workpiece.

9. A fixture as claimed in claim 2 further comprising a set of spaced ribs on the interior of said guide leg against which the workpiece first surface rests, the exit opening of said guide channel being in a space between said set of spaced ribs.

10. A fixture as claimed in claim 2 wherein said interior surface of said base leg has a recess located at an extension of a line of said guide channel, said recess being of a size into which the tip end of a drill bit can extend after it passes through the workpiece second surface without the drill bit tip end engaging said base leg.

11. A fixture as claimed in claim 10 wherein said recess in said base leg extends completely across the width of said base leg interior surface to permit viewing of the drill bit tip end entering into said recess from either side of said base leg.

\* \* \* \* \*